Nov. 11, 1969        L. C. JOHNSON        3,477,136
DIMENSIONAL GAGE WITH EQUALIZED SPRING PRESSURE
Filed Nov. 28, 1967        3 Sheets-Sheet 3
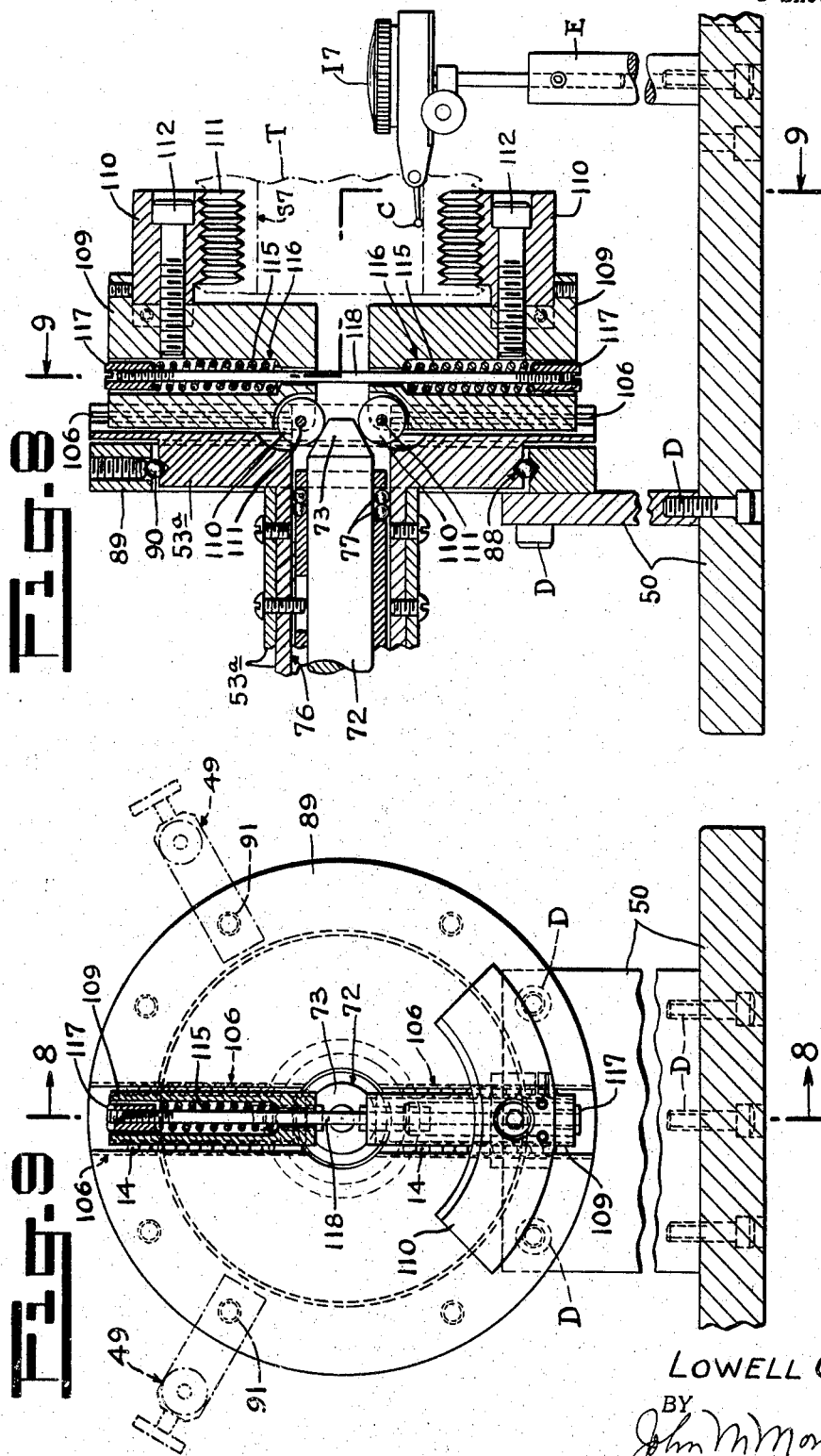
INVENTOR.
LOWELL C. JOHNSON
BY
ATTORNEY United States Patent Office 3,477,136
Patented Nov. 11, 1969

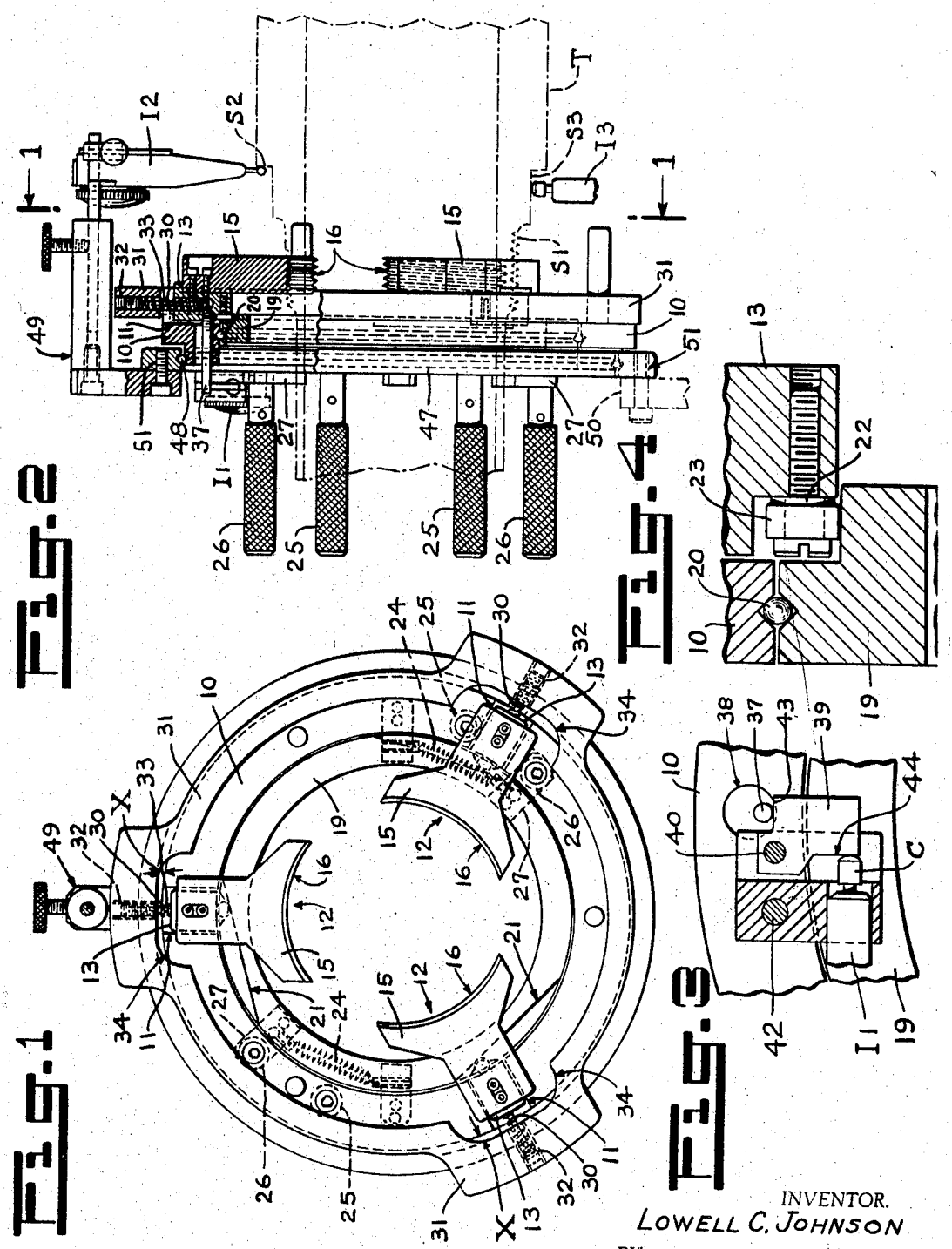

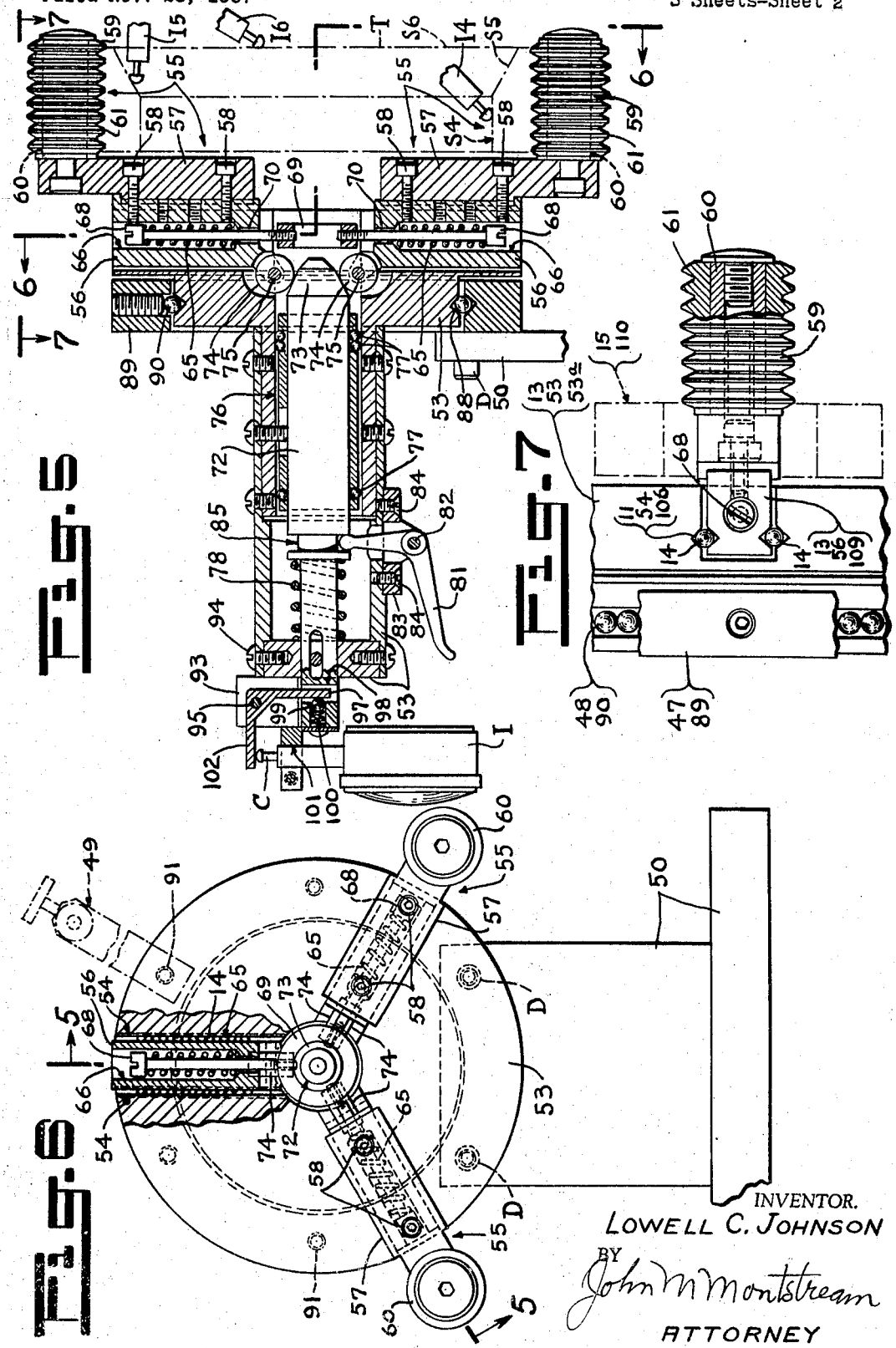

3,477,136
DIMENSIONAL GAGE WITH EQUALIZED SPRING
PRESSURE
Lowell C. Johnson, Granby, Conn.
(820 Park Ave., Bloomfield, Conn. 06002)
Filed Nov. 28, 1967, Ser. No. 686,262
Int. Cl. G01b 5/08, 7/12
U.S. Cl. 33—178    12 Claims

ABSTRACT OF THE DISCLOSURE

The dimensional gage disclosed includes a support which radially guides the gaging elements each of which is spring biased into gaging contact. The spring bias reacts against an element which is freely movable relative to the guiding support to equalize the spring pressure on the gaging elements and thereby centralize the support or the gaging elements relatively to the other. The gaging elements are cammed radially in a direction to oppose the bias to open the same for insertion of a test part.

The invention relates to a dimensional gage having a frame with two or more surface contacting means all of which are mounted on the frame to move radially for engaging a circular test surface. This gage centralizes the test part with respect to the axis of the gage frame or, when the test part is held rigidly, centralizes the gage frame with respect to the axis of the circular surface of the test part on which the gage is mounted. The gage is used for testing the centricity or squareness of one or more other surfaces with respect to the circular surface of the test part. Spring means is provided for each contacting means to propel the same radially into contact with the circular surface. With earlier gages, in order to assure that the gage frame takes a position coaxial with the axis of the circular surface of the test part or the contacting surfaces of the contacting means and hence the test part takes a position with its axis in alignment with the axis of the frame, it has been necessary to equalize closely the spring pressure of each of the spring means with respect to each other. The invention herein inherently equalizes the spring pressure between spring means for all of the gaging means whereby relatively precise adjustment of the spring pressure for each spring means is avoided or of no importance.

One way of accomplishing the centricity or squareness test is to rotatably mount a centricity ring on a circular bearing or surface on the frame which ring carries one or more indicator mounting means each of which receives an indicator and the ring and its indicators are rotated around the gage and the test part. If, however, the part to be tested is small enough so that the gage can be mounted on a stand, then the mounting of the gage on a base or stand is through the centricity or outer ring so that the gage and the test part held thereby rotate on the centricity ring. Indicators, resting or carried on the base of the stand or a table, give a centricity and/or squareness test as the gage and the test part are rotated in the outer ring. The gage herein, preferably, tests also, the accuracy of the circular surface of the test part as well as centralizing the gage frame on the axis of the circular test surface or centralizing the test surface with respect to the gage frame.

Such gages find particular usefulness when the circular surface is a screw thread and the gaging elements have thread gaging surfaces. The invention is applicable amongst others to the gage shown in application Ser. No. 570,595 filed Aug. 5, 1966, now Patent No. 3,388,476 and the type of gage shown in Patent 3,296,705 dated Jan. 10, 1967.

The invention is directed to a construction of gage having two or more contacting means each having a contacting or gaging surface with each of the contacting means mounted on a frame for radial movement and having spring means for each contacting means to propel the latter into contact with the test surface. The main object is to provide such gages with equalizing means for the spring means so that the frame centralizes on the cylindrical surface of the test part with the axes of the frame and cylindrical surface in alignment or the axes of the contacting means and the test part come into alignment with the frame axis without the need to adjust the compression in each spring means so that it is substantially the same for each contacting means.

Another object is as above and in which the frame carries a circular bearing the axis of which is coaxial with the axis of the frame so that the cylindrical surface of the test part, or the contacting surfaces of the contacting means, are coaxial when gaging whereby one or more indicators may be mounted thereon for making an accurate centricity and/or squareness test of one or more other surface or surfaces on the test part with respect to the contacting surface and the cylindrical surface of the test part.

Another object is as in each of the objects above and in which the surface contacting means are gaging means for gaging the accuracy of the diameter of the cylindrical surface and has particular usefulness when the circular surface is a screw thread.

Other objects of the invention will be more apparent from the following description when taken in connection with the accompanying drawings illustrating preferred embodiments of the construction and invention; in which, FIGURE 1 is a front view of a gage showing a spring equalizing ring for use on a large diameter gage for engaging or gaging an external surface;

FIG. 2 is a side view of FIG. 1 partly in section;

FIG. 3 is an enlarged view showing the motion transmitting mechanism between a gaging means and an indicator to indicate the diameter of an external cylindrical surface or thread;

FIG. 4 is a detailed view of the cam surface on the cam ring and a cam roller;

FIG. 5 is a sectional view of a gage of different construction as to the operating means and spring equalizing means;

FIG. 6 is an end view of the gage of FIG. 4 with part in section take on line 6—6 of FIG. 5;

FIG. 7 is an enlarged view looking at the guideway and mounting means for a radially movable slide as applicable in the gages of FIGS. 2, 5 and 9;

FIG. 8 is a sectional view of a gage having two contacting or gaging elements of segmental form; and FIG. 9 is an end view of the gage of FIG. 7 with a part in section.

There are surfaces on a test part having a cylindrical surface of large diameter, such as a shaft having a length of a foot or more, in which it is desired to test one or more other surfaces on the test part as to its or their centricity and/or squareness with respect to the cylindrical surface. It is also desirable in a large diameter gage which is to be used on a surface of the test part which is distant from the ends of the test part or when still mounted on a machine such as a lathe that there not be any structure of smaller diameter or projecting radially inwardly beyond the contacting or gaging surfaces. This type of gage may be carried or mounted on or adjacent to the tail stock of a lathe or other machine during machining or turning so that the gage may be moved out of the way when not in use over, or on, the tail stock of the machine. When it is desired to test a surface for centricity or squarness with respect to the cylindrical surface, the gaging means is expanded and moved over the cylindrical surface and then contracted into contact therewith to support the gage on the surface, or thread, and to test one or more other surfaces for centricity and/or squareness with respect thereto without removing the test part from its mounting on the machine. The gage illustrated in FIGS. 1–4 is of this type.

This gage includes a frame 10 having a radially extending guideway 11 for each radially movable contacting means 12, three being shown. The guideways are shown as ball grooves in the side walls of a channel. Each contacting means preferably includes a slide 13, FIG. 4 mounted on each guideway for radial movement and an attached contacting or gaging element. The slide is preferably mounted on ball bearings 14 with suitable V grooves in side walls of the slide and the guideway. A contacting element 15 is secured to each slide which element carries a contacting surface 16 for engaging the cylindrical surface. The contacting element is shown as a thread segment having an arcuate contacting surface 16 which would be concave for an external thread. For a cylindrical surface which is a thread, the contacting surface carries a section of a mating thread or nut corresponding with the external thread to be contacted. It is clear that the slide and contacting element may be an integral part, however, in two parts the contacting means may be substituted for others so that the gage is suitable for many sizes and thread characteristics.

Suitable means are provided to expand the contacting means so that the contacting means may be moved axially over the test surface whereupon spring means contracts the contacting means into contact with the circular surface. Suitable operating means is provided to radially move the contacting means in their respective guideways, or to expand the same in the gage illustrated, that shown being a cam ring 19 rotatably mounted on the frame on a circular bearing 20. The cam ring carries a cam surface 21 for each contacting means which may be a straight or segmental cut-out in the periphery of the cam ring for each gaging means. A pin or stud 22 is carried by the slide of each contacting means and on each pin there is mounted a cam roll 23 for engaging its respective cam surface. Operating spring means 24 propels the cam ring in a direction to expand the contacting means or propel them raidally outwardly, however, the cam ring spring means is selected or adjusted so that it is not strong enough to accomplish this as will appear. The cam ring is rotated in order to expand the contacting means and a pair of handles 25 and 26 on opposite sides of the cam ring are provided for this purpose. One handle 25 is secured to the frame and the other 26 is secured to the cam ring such as through a handle bracket 27 attached to the cam ring.

Spring means provided to propel each contacting means radially inwardly. The spring means shown in a helical coil spring 30 each fitting into a hole in its respective slide with the inner end engaging the bottom of the hole to press the contacting means radially inwardly. The outer end of each spring engages equalizing means shown as an equalizing ring 31. It is desirable that an adjusting screw 32 be provided in the equalizing ring for each spring and a spring pin 33 is carried thereby extending through the helical spring to retain the spring straight but not interfering with its pressure or the freedom of the equalizing ring to float to some degree on the springs 30. Since the spring means for each contacting means presses gainst a single equalizing ring the tension in all of the spring means equalizes through the ring and avoids any need to rather precisely fix or adjust the spring compression in each spring means to a fairly close approximation of the spring pressure for each of the three spring means. Since the gage is relatively heavy, some weight has been saved by having the equalizing ring of a conveniently smaller diameter, considering access to parts and a diameter larger than the contacting surfaces with an outwardly extending recess 34 for each contacting means which necessarily increases the outer periphery of the equalizing ring at the recesses. The contacting means spring means are selected or adjusted to overcome the expanding pressure of the cam ring spring means 24 acting through the cam surfaces 21.

The contacting means are preferably gaging means for testing the accuracy of the diameter of the cylindrical surface as well as centralizing the gage frame on the contacting surface of the test part. The contacting elements 15 in such case are gaging elements and the contacting surfaces are gaging surfaces. For a screw thread, a segmental gaging element would have a contacting surface 16 which is a part of a mating internal thread.

Any suitable means may be used to indicate the position of one of the gaging means which thereby indicates the accuracy of the diameter of the circular surface of the test part or screw thread S1. In this gage, motion transfer means between a gaging means and an indicator is provided. This means includes a motion transfer pin 37, FIG. 3, carried by the slide 13 of one of the gaging means. This pin projects through a hole 38 in the ring frame and engages a motion transfer lever 39 which is pivotally mounted on a pin 40 carried by a bracket 41 secured to the frame by a screw 42. Since one gaging means moves a radial distance, in order to have the gage to be direct reading for the full diameter of the test surface or thread, the motion transfer pin 37 engages a surface 43 of the lever 39 which is one unit distance from the pivot pin and the contractor C of the indicator I1 engages a surface 44 carried by the motion transfer lever at a two unit distance from the pivot pin to give a two to one multipling factor.

The gage carries an outer or centricity ring 47 which is mounted on the ring frame 10 by ball bearings 48 which bearing is coaxial with the axis of the frame 10 and must be coaxial with the contacting or gaging surfaces 16 of the gaging means when testing for centricity and hence would be coaxial with the contacting surface S1 of the test part T. The outer ring carries one or more indicators I2, I3, with each indicator carried by a suitable bracket 49. The contactor of indicator I2 is shown engaging a surface S2 to test it for squareness and the contactor of indicator I3 engages a surface S3 to test the same for concentricity with respect to the surface S1. By rotating the centricity ring the indicators I2 and I3 test 360 degrees of their respective surfaces. If the pointers on the dial do not move it is known that surface S2 is square and S3 is concentric.

If the test part is short, the gage may be used by securing the centricity ring 47 to a base 50 in which use the gage and the test part rotate on the centricity ring. When so used the indicators may continue to be mounted on the ring, however, it would be more convenient to have these indicators carried by a suitable or similar bracket 49 resting on the base as will appear.

FIGS. 5 and 6 illustrate a form of gage having equalizing means for the spring means in which the gage has a different form of operating means for the contacting means and a different form of equalizing means. The gage illustrated preferably serves also to gage the accuracy of the diameter of the cylindrical surface on the test part. The gage shown is for an external screw threaded surface and is to be used to gage centricity and/or squareness of another surface with respect to the external surface as will appear. The spring means for each contacting means presses the same radially inwardly into contact with the external cylindrical surface.

This gage has a frame 53 shown as comprising several parts secured together, with a plurality of radial guideways 54, three being particularly shown. A contacting means particularly shown includes a slide 56 which is mounted on the guideway on ball bearings 14, FIG. 7.

A contacting element is secured to each slide which could be a segment 15 such as shown in FIG. 1. Each of the contacting elements shown comprises a carrier 57 which is secured to the slide by screws 58 and on each carrier is mounted a contacting or gaging roll 59 which provides a contacting surface. Each roll is rotatably mounted on stud means including a stud 60 which is secured to the carrier and for a cylindrical test surface having a screw thread, each roll has thread engaging peripheral ridges 61.

Spring means is provided for each contacting or gaging means to propel the same radially inwardly on the guideway into contact with the circular surface of the test part. The spring means shown is a helical spring 65 loosely received in a radial spring bore 66 in its slide 56 with the inner end of the spring engaging the bottom of the bore. The other end of the spring is engaged by equalizing means comprising a spring pin 67 loosely received within the coils of the spring and having a head 68 loosely received in the bore 66 and engaging the outer end of the spring. Each spring pin is shown threaded into a clearance ring 69 which is provided solely for the purpose of assuring that an operating member, to be described, does not engage the same. The equalizing means shown is a spider with an arm or pin for each spring means and hence for each contacting means. The pin passes through a hole 70 in the slide affording clearance. The spring equalizing means has sufficient freedom of movement or float so that it is solely responsive to the compression of all of the spring means 65.

Suitable operating means is provided to expand the contacting means for insertion of the gage over the circular surface of the test part. This operating means may take several forms that particularly shown includes an operating member 72 having a cone 73 at the end thereof which cone engages a roller 74 rotatably mounted on a pin 75. One such roller is carried by each slide. The operating member is mounted in an axial bore 76 in the frame for axial movement and preferably on ball bearings 77. An operating member spring means shown as a spring 78 engages the operating member to propel the same to the right, as shown in FIG. 5. The operating member spring means for a gage designed to engage an external surface is selected to be of less power or compression than that of the combined spring means for the contacting means so that the contacting means are moved radially inwardly by the spring means against the outwardly directed pressure of the operating means spring means. The latter therefore, maintains the operating member in contact with rollers 74 so that the frame centralizes on the cylindrical surface. The cone 73 has an angle whose tangent is .500 so that a standard dial on the indicator may be used.

Manual means of any form is provided to move the operating member to the right to expand the contacting means for insertion over and upon the cylindrical surface. This manual means is shown as a handle 81 pivotally mounted on a pin 82 which is carried by a handle bracket 83 which is secured to the frame by means of screws 84. The end of the handle engages in a groove 85 in the operating member so that pressing handle inwardly moves the operating member to the right to expand the contacting means so that it will pass axially over the circular surface. Release of the handle causes the spring means 65 to contract the contacting means radially inwardly into contact with the cylindrical or threaded external surface. This surface then has its axis in axial alignment with the operating member and the frame.

This gage can be converted into a gage for engaging an internal cylindrical surface or thread merely by turning the handle bracket around so that the handle extends to the right from that shown in FIG. 6 so that the handle will now propel the operating member to the left. The operating member spring 78 is then selected or compressed so that it is stronger than the combined pressure of the spring means so that these springs are dominated by the operating member spring to move the contacting means radially outwardly into contact with an internal surface or thread against the pressure of the spring means 65. When this form of gage is used for an internal surface an equalizing means is unnecessary.

The frame carries a circular surface whose axis is concentric with the axis of the operating member and frame and hence is coaxial with the contacting surfaces of the contacting or gaging rolls 59. The circular surface is shown as a bearing surface 88 upon which a centricity ring 89 is mounted for rotation. The circular bearing shown is a ball bearing groove which receives balls 90 and rotatably mounts the centricity ring thereon. One or more indicator brackets, such as the brackets 49 shown in FIG. 2, may be secured to the ring for carrying an indicator for testing the centricity and/or squareness of another surface or surfaces with respect to the cylindrical surface or thread. Since the contacting elements are all radially movable and are radially propelled an equal amount, when the gage is mounted upon a cylindrical surface or thread, the gage frame and hence the centricity surface or bearing 88 and centricity ring are positioned coaxial with respect to the cylindrical surface on the test part.

Preferably the gage is also constructed to test the accuracy of the diameter of the contacted surface or thread in which construction each contacting means has a gaging surface and the plurality of contacting means constitutes gaging means as well. Any suitable means may be provided to indicate the radial position of the gaging means that shown giving a reading of the accuracy of the test surface by indicating the relative position of the operating member when the plurality of contacting means of the gage are engaging the cylindrical surface of the test part. The indicator means for determining the accuray of the diameter of the cylindrical surface is shown as including an indicator bracket 93 suitably secured to the frame, such as by screws 94. This bracket carries a pivot pin 95 on which is mounted a motion transfer lever 96 of bell crank form with one arm 97 being engaged by the operating member. The arm is shown as entering a slot 98 in the operating member and this slot carries a contact part or particularly a contact point formed by a ball 99. The ball preferably is pressed to the right by a spring 100 so that the ball may retract under unusual pressure. The ball engages the lever. The bracket also carries an indicator mounting in the form of a bore 101 in which is secured an indicator I and the contactor C of the indicator is actuated by the other arm 102 of the motion transfer lever to indicate any deviation of the test surface from that of a test surface having a perfect diameter or thread as set up initially with a master surface or thread plug.

FIGS. 8 and 9 illustrated a gage having a frame 53a with two segmental gaging elements which are angularly spaced 180 degrees apart. The operating means with its operating member 72 and concentric ring 89 are the same as that described in connection with the gage of FIGS. 5–7 and need not be further described. The same reference numerals have been applied thereto. The frame has two guideways 106 directly opposite from each other and each guideway is, preferably, formed in opposite side walls of two channels in the frame. The guideways are shown as ball bearing V grooves.

A contacting or gaging means is mounted in each guideway for radial movement. Each contact or gaging means includes a slide 109 having opposite faces and is mounted in its guideway through ball grooves in opposite faces of the slide in which grooves and guideway grooves, ball bearings 14, FIG. 7, are received. Each slide carries a contacting or gaging element 110 which is shown as a segment having a concave gaging surface 111. The gaging surface shown has thread gaging ridges for engaging and gaging an external threaded surface of a test part T. Each gaging segment is fixed to its slide such as by a screw 112. The mounting of the slide in the guideway is the same as that shown in FIGURE 7.

Spring means are provided for each of the contacting or gaging means for propeling the same radially inwardly into engagement with the contacting or test surface. Each of the spring means is shown as a helical spring 115, the inner end of which engages the botom of a bore 116 in its respective slide. The outer end of each helical spring is engaged by a nut 117 carried by a rod 118 which extends within each spring. The rods for each spring is in reality a single rod between the two contacting means so that the two spring means have their compression equalized. Regarded as separate rods their ends are connected together. The nuts enable the compression of the spring means to be adjusted. The nuts and rods, or rods, comprise equalizing means for the spring means. As a consequence, the spring means need not be subjected to the time consuming operation of being adjusted fairly accurately to the same pressure or compression as the other spring means as would be necessary if they were separate entities and the equalizing means had not been provided.

Each slide carries a roller 121 on a pin 122 which engages the conical end of the operating member 73. Axial movement of the operating member to the right presses the contacting means radially outwardly against the tension of the spring means whereupon the gaging elements 109 may be positioned axial over the test surface or thread. Release of the operating handle for the operating member permits the contacting means to contract radially under the pressure of their spring means to engage the test surface or thread since the spring means is adjusted to overcome the operating member spring means as described with respect to FIG. 5 and the operating member 72 moves to the left.

The frame carries the same centricity surface 88, shown particularly as a V groove extending around the periphery of the frame and the axis of which is coaxial with the axis of the frame and the operating member. This gage, without more, could be mounted on a thread on the end of a test piece mounted in a cluch on a machine, whereupon rotation of the gage and the test piece upon the machine with an indicator engaging the centricity surface 88 would indicate whether or not the thread on the test part is concentric or eccentric with respect to the axis of the test part. The gage has greater usefulness however when a centricity ring 89 is mounted on the centricity surface such as through a ball groove and ball bearings 90. The gage may then be mounted on a base B by means of bolts D threaded into the centricity ring. The gage and test part may be rotated together on the centricty ring whereupon an indicator I7 carried by the base on a suitable bracket E carried by or resting upon the base will indicate the centricity of another surface S7 with respect to the thread. The squareness of a face of the test part with respect to a test thread could also be determined by an indicator contacting such surface. The diameter of the test thread may also be gaged through an indicator showing the position of the operating member as illustrated in FIG. 5.

It is clear that either of the gages of FIGS. 5 and 8 may be disconnected from the base and the gage transported to a surface or thread to be gaged such as on a large or heavy test part. An indicator mounting means, such as the mounting means 49 as shown in FIG. 2, may be secured in the holes 91 of the centricity ring as illustrated in part in dot-dash lines whereupon the centricity and/or squareness of another surface or surfaces may be tested with respect to the thread of the test part. When so used the gage and test part remain stationary on the test part and the centricity ring is rotated with its indicator or indicators and with the contactor of each indicator in contact with the surface to be tested.

The spring means of the gage illustrated have their pressure or compression adjusted when the gages are used with their axes in horizontal position. In the gage of FIGS. 1–4 the spring means also support practically the entire gage, with the result that each of the springs 30 must be able to support the weight of the gage when it is in test position. Consequently, the difference in compression between any one spring 30 and the spring 24 is approximately equal to the weight of the gage. Since the contacting or gaging means which are above horizontal are supported by the test part, the spring means do not support such part or parts. The weight of the gage would be supported on the top spring means in the position illustrated in FIG. 1 or distributed between two of the spring means in the event that two of the contacting means are above the center line or in uppermost position. If this gage were carried on a bracket, such as bracket B to gage a relatively small test piece, in that manner of use the differential compression in the spring means 30 as compared to that of the operating member spring 24 would be the weight of the contacting or gaging means and the test part, since these parts must be supported by these springs. A simple and effective way to satisfactorily adjust the compression of the spring means 30 is to adjust them while on the test piece and sighting the relative position of frame and ring 31 such as by the space $x$ between the inner surface of 31 and the outer surface of ring frame 10 until these spaces are approximately equal. This adjustment suffices.

In the gages illustrated in FIGURES 5 through 9, with the axes horizontal and the gages on a bracket B, the main part of the gage is supported by the bracket so that it is the test part and the gaging means which are supported on the spring means 65 and 115 respectively so that the differential compression between springs 65 and 78 and 115 and 78 would be a little greater than the weight of these parts.

If the test part is small, or relatively small, all of the above described gages may be supported in a suitable manner with their axes in a vertical position. In this position of the gaging means, the differential compression in the spring means for the contacting or gaging means as compared to that of the operating member spring need be relatively small such as a pound or two of greater compression in the spring means, since the spring means for the gaging means are not supporting the test part, the gages nor any part thereof.

Although, the gages described herein have been described in connection with a cylindrical surface, either plane or threaded, it is clear that the gage is applicable also with respect to a circular conical surface or a tapered thread with the gaging or contacting surfaces of the segmental contacting means or gaging means conforming to the taper surface. If the gaging elements use the roll type of elements then the rolls are tapered to conform to the tapered test surface as is well known.

The gages particularly described are generally of two types differing primarily in the form of the operating means which moves the contacting or gaging means radially for mounting of the gage on the cylindrical surface. In the construction of FIGURES 1 through 4, a rotatable cam ring constitutes the operating member of the operating means and in the construction of FIGS. 5 through 10 the operating means includes an axially movable operating member 72 having an operating cone thereon. As a consequence, the operating member of the gage of FIG. 1 secures radial movement of the contacting or gaging means in one or an outward direction by rotation of the cam. In the construction of FIGS. 5–9 it is the axial movement of the operating member which secures radial outward movement of the gaging or contacting means for positioning of the gage upon a cylindrical surface or positioning of the test part within the contacting means.

The gages illustrated with equalizing means for the spring means is applicable for a gage for external surfaces since surface or gaging contact is secured through a plurality of spring means, namely a spring means for each contacting means propelling the latter radially inwardly into contact with the contacting surface. It has no application in the gages illustrated in FIGS. 5–9 when such gages are used for internal surfaces or threads since then it is a single operating member spring 78 operating on the operating member which propels the contacting elements into contact with an internal surface against the lesser compression of the several spring means. A gage with spring means for each contacting means propelling the latter radially outwardly to engage an internal surface or thread could usefully employ equalizing means in the same manner as described. The spring means would merely be reversed in their operation to propel the contacting means outwardly which would require the radially outer end of the coil spring of the plurality of spring means to engage its respective contacting means and the inner end of each coil spring to engage an equalizing ring or spider. The operating means in this gage would have its operating member propel the contacting means radially inwardly, such as with an inner cam surface or cone engaging the slide rolls so that the contacting means would be contracted for axial insertion of the gage within the test internal surface or internal thread. As a practical matter the construction particularly illustrated is preferred because it is simpler to convert these gages from an internal to an external gage.

It has been mentioned above that the equalizing means is free floating in the ring construction of FIGURES 1 to 4, the spider of FIGS. 5–7 and the straight rod 118 of FIGS. 8 and 9. With the rods passing through the coil springs to give some degree of axial stiffness or support thereto, the equalizing means or members do not have a complete free floating characteristic although it is to some extent. In other words, the equalizing ring 31 and the spider 69 and rod 118, can be moved laterally, circumferentially, and radially within the limits of the structure illustrated so that, the equalizing means or member is completely responsive to the pressure of all of the spring means and solely the spring means in normal use and operation.

The gages herein find their greatest usefulness when a centricity ring is provided. The gage has more limited usefulness when it is provided with solely a centricity surface which could be merely a cylindrical surface or the bearing surface 88 which is accurately concentric with the axis of the frame. This simpler form of gage would be used such as in the gage of FIGURES 1 through 5 by mounting the gage on a test surface or thread and rotating the test part and the gage resting thereon on the machine. An indicator carried by the machine or resting on a surface of the machine and having its contactor contacting the centricity surface would indicate the centricity of the screw thread with respect to the axis of the test part.

In each of the gages illustrated, the centricity ring can be used in two ways, first, it may carry indicator mounting means 49 secured by screws received in the threaded holes 51 and 91 of the ring. In a gage so constructed the frame and test part remain stationary and the centricity ring with its indicators rotates around the frame and test part to test another surface or surfaces for centricity and/or squareness with respect to the test thread. The second manner in which each gage with a centricity ring may be used is to attach the ring to a base 50 or B by use of the threaded holes in the ring. When the gage is used in this manner the indicators are carried on mounting means which rest upon the base or even a bench on which the base rests. The centricity ring then is stationary and the gage with the test part held therein is rotated upon the centricity ring with at least one indicator contacting another surface to determine the centricity or squareness of such surface with respect to the contacting surface or thread of the test part.

Means are provided for each spring means in all of the gages illustrated by which the compression of the spring means may be adjusted. This adjustment is through the screw 32 for each spring means in the gage of FIGURES 1 through 4, the screws 68 forming the spider construction of FIGS. 5–7 and is the nut means 117 carried by a threads on the end of rod means 118 in the gage of FIGURES 8 and 9. It is obvious that the spider 68, 69 may be a three rod structure threaded at the outer ends of the rods and carrying nuts 117 as taught in the gage of FIGS. 8 and 9.

The spring means in each of the gages described is shown as a helical spring and of substantial length. Such a spring is softer and can be adjusted more accurately than a stiffer or shorter spring for adjustment of compression. This softer spring however, tends to give too great freedom to the spring means that is some buckling, and hence the rods passing through at least a substantial length of the spring eliminates any objectionable buckling and keeps the spring substantially straight, yet provides sufficient freedom so that the spring equalizing action of the equalizing means is not interfered with.

Equalizing means in the form of a ring 31 as shown in FIGS. 1–4 could be used, if desired, in the gages of FIGS. 5–9 and in the same manner the spider form could be used with the gage of FIGS. 1–4. The form of equalizing means shown in the gages of FIGS. 5–9 is simpler.

In the gages of FIGS. 5–9 the indicator I indicates the position of the operating member 72 when the contacting means is engaging a test cylindrical surface. This is merely another way or remote way of indicating the position of the gaging or contacting means and hence gaging the diameter of the test cylindrical surface. The operating spring means 24 and 78 project their respective operating member 19 and 72 into contact with all of the contacting means to assure that the frame and its centricity ring is centralized on the contacting or gaging surfaces of the contacting means and hence on the cylindrical surface of the test part. This assures the accuracy of the centricity and squareness test of another surface or surfaces with respect to hte cylindrical surface of the test part.

The equalizing means for the spring means isolates the latter from any part or effect on the centralizing of the frame on the gaging surfaces of the contacting or gaging means and hence on the axis of the cylindrical surface engaged by the contacting means. Centralizing of the frame of the test part on the fixed frame is secured solely through the operating means and the spring means which propels the operating means into contact with and exerts pressure on the contacting means or particularly on the rolls carried by the latter to shift any floating weight either the gage frame and parts fixed thereto, or the gaging elements and the test part, into axial alignment.

This invention is presented to fill a need for improvements in a dimensional gage with equalized spring pressure. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A dimensional gage for a test part having a cylindrical surface comprising a frame, at least two guide means carried by the frame each extending radially and angularly spaced with respect to each other, contacting means for each guide means and mounted on the latter for radial movement, each contacting means having a contacting surface for engaging the cylindrical surface of a test part, equalizing means, spring means for each of the radially movable contacting means extending between the equalizing means and its respective contacting means to propel the contacting means radially in one direction and into contact with the cylindrical surface of the test part; and operating means including an operating member operatively connected with each of the contacting means, mounting means carried by the frame for mounting the operating member for movement thereof relative to the frame, operating spring means connected with the operating member to press the operating member into contact with all of the contacting means when the latter is engaging a test part and to centralize the frame or the contacting means with respect to the other, and manual means connected with the operating member to move the same on the frame and the contacting means radially in the other direction.

2. A dimensional gage as in claim 1 including an indicator mounting means carried by the frame adapted to receive an indicator to indicate the position of at least one of the contacting means.

3. A dimensional gage as in claim 1 including a circular centricity surface carried by the frame having its axis co-axial with the axis of the frame.

4. A dimensional gage as in claim 3 including a centricity ring rotatably mounted on the centricity surface, and means carried by the centricity ring to secure thereto one of the parts including an indicator mounting means and a base.

5. A dimensional gage as in claim 1 in which the spring means are helical springs, and the equalizing means includes rod means having a rod for each helical spring passing therethrough and fitting loosely therein.

6. A dimensional gage as in claim 5 including an adjusting nut carried by at least one rod to adjust the compression of the spring means.

7. A dimensional gage as in claim 1 in which the spring means has an inner end and an outer end with the inner end engaging its respective contacting means and the outer end engaging the equalizing means.

8. A dimensional gage as in claim 7 in which the contacting means is a segment having a concave gaging surface, the spring means propelling the contacting means radially inwardly, the equilizing means being a ring circling the contacting means and being engaged by the outer end of each spring means.

9. A dimensional gage as in claim 8 in which the spring means are helical springs, and a rod carried by the equalizing means for each helical spring and passing through a substantial portion of said spring and loosely fitted therein for limited movement.

10. A dimensional gage as in claim 9 including a nut carried by each rod to adjust the compression of the spring means.

11. A dimensional gage as in claim 7 in which the frame carries a central bore, the operating means including an operating member mounted in the central bore for axial movement therein to move the contacting means radially outwardly, the spring means being helical springs having an inner and an outer end, the inner end of each spring means engaging its contacting means to propel the same radially inwardly, and the equalizing means being a rod for each helical spring passing therethrough and loosely fitted therein for limited movement, the rods being integral or connected together at their inner ends and engaging the outer end of its respective spring means.

12. A dimensional gage as in claim 11 including means carried by each rod to adjust the compression of the spring means.

References Cited

UNITED STATES PATENTS 3,296,705   1/1967   Johnson.
3,388,476   6/1968   Johnson.

SAMUEL S. MATTHEWS, Primary Examiner